(12) United States Patent
Oyama

(10) Patent No.: US 9,118,060 B2
(45) Date of Patent: Aug. 25, 2015

(54) BATTERY MOUNTING STRUCTURE

(75) Inventor: Masashi Oyama, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 325 days.

(21) Appl. No.: 13/592,714

(22) Filed: Aug. 23, 2012

(65) Prior Publication Data

US 2013/0052501 A1  Feb. 28, 2013

(30) Foreign Application Priority Data

Aug. 24, 2011  (JP) ................................. 2011-182924

(51) Int. Cl.
*H01M 2/10* (2006.01)

(52) U.S. Cl.
CPC ........ *H01M 2/1083* (2013.01); *H01M 2220/20* (2013.01)

(58) Field of Classification Search
CPC .................................................. H01M 2/1083
USPC ......................................................... 180/61
See application file for complete search history.

(56) References Cited

FOREIGN PATENT DOCUMENTS

| JP | 10-338485 A | | 12/1998 |
|---|---|---|---|
| JP | 2002-187507 | | 7/2002 |
| JP | 2002187507 | * | 7/2002 |
| JP | 2004208443 | * | 7/2004 |
| JP | 2007-83963 | | 4/2007 |
| JP | 2008037135 | * | 2/2008 |
| JP | 2009-40198 | | 2/2009 |

* cited by examiner

*Primary Examiner* — Nicholas P D'Aniello
(74) *Attorney, Agent, or Firm* — Oblon, McClelland, Maier & Neustadt, L.LP.

(57) ABSTRACT

A mounting portion of a battery is provided with a bracket that is placed to face a front face of the battery. A wire harness is placed forward of the battery in a vehicle and is displaced to one side of the bracket in a vehicle width direction, and a terminal that is connected to the wire harness is connected to an electrode. A guiding portion extends from an upper end portion of the bracket to a side portion of the bracket on one side in the vehicle width direction, and the wire harness can be slid along the guiding portion when the wire harness contacts the guiding portion from above. Accordingly, the wire harness is guided by the guiding portion to a position in a routed state in the vehicle width direction.

12 Claims, 6 Drawing Sheets

F I G. 5A
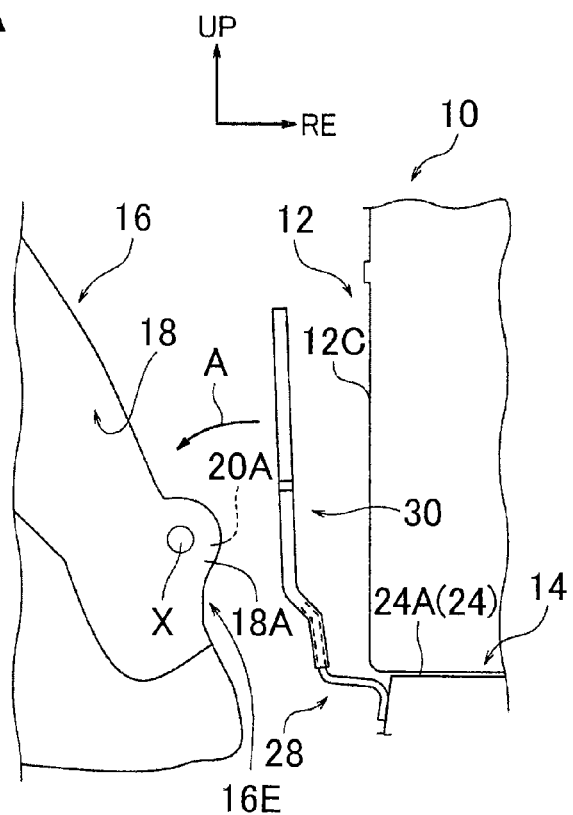
F I G. 5B
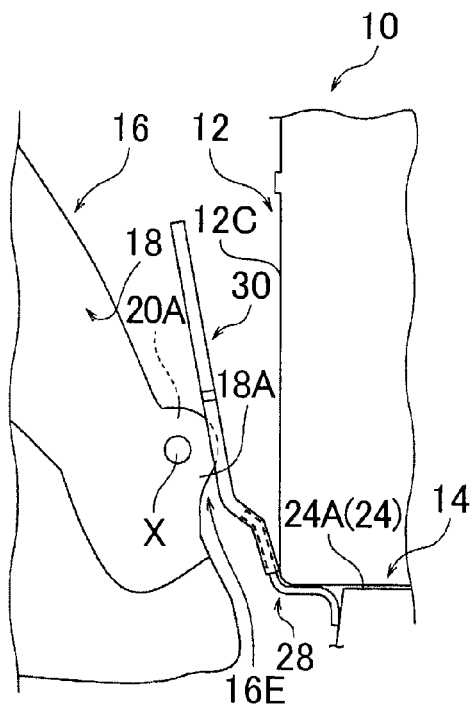

BATTERY MOUNTING STRUCTURE

INCORPORATION BY REFERENCE

The disclosure of Japanese Patent Application No. 2011-182924 filed on Aug. 24, 2011 including the specification, drawings and abstract is incorporated herein by reference in its entirety.

BACKGROUND OF THE INVENTION

1. Field of the Invention

The present invention relates to a battery mounting structure.

2. Description of the Related Art

In a battery mounting structure, a battery is mounted on a vehicle and fixed on a floor panel side. In such a structure, for example, while a battery support and the like restrict a displacement of the battery in a vehicle width direction, a vertical wall that is provided in a front side of a battery mounting portion is placed to face a front face of the battery (see JP 2002-187507 A, for example). The vertical wall is provided to protect the battery from a rear wheel house and the like that are placed forward of the battery during a frontal collision of the vehicle.

However, if a routing position of a wire harness in the above structure is in a front side of the battery, the wire harness interferes with the vertical wall when a terminal that is connected to the wire harness is being connected to an electrode of the battery. Accordingly, an improvement can be made for a connecting procedure.

SUMMARY OF THE INVENTION

In view of the above fact, the present invention provides a battery mounting structure that has room for improvement from the viewpoint of working procedure when a terminal that is connected to a wire harness is being connected to an electrode of the battery.

The battery mounting structure according to an aspect of the present invention includes: a battery that is mounted in a vehicle and includes an electrode on an upper portion of the battery; a bracket that is provided on a mounting portion of the battery and is placed to face a front face of the battery; a wire harness that is connected to a terminal connected to the electrode of the battery and is placed forward of the battery in the vehicle and displaced to one side of the battery in a vehicle width direction; and a guiding portion that extends from an upper end portion of the bracket to a side portion of the bracket on one side in the vehicle width direction and guides the wire harness to a position in a routed state by sliding the wire harness to the one side in the vehicle width direction when the wire harness contacts the guiding portion from above.

According to the battery mounting structure in the aspect, the terminal that is connected to the wire harness is connected to the electrode on the upper portion of the battery, and the wire harness is placed forward of the battery in the vehicle and displaced to the one side of the bracket in the vehicle width direction. Here, the guiding portion extends from the upper end portion of the bracket to the side portion of the bracket on the one side in the vehicle width direction, and the wire harness can be slid to the one side in the vehicle width direction along the guiding portion when the wire harness contacts the guiding portion from above. Accordingly, the wire harness is guided by the guiding portion to the position in the routed state, and thus is connected efficiently.

According to the battery mounting structure in the constitution described above, it is possible to improve a procedure for connecting the terminal that is connected to the wire harness to the electrode of the battery.

In the battery mounting structure in the aspect, the bracket may include a curling portion that is folded in a curved shape from the upper end portion of the bracket to the side portion of the bracket on the one side in the vehicle width direction, and the guiding portion may constitute a part of the curling portion.

According to the battery mounting structure in the constitution described above, the curling portion of the bracket is formed from the upper end portion of the bracket to the side portion of the bracket on the one side in the vehicle width direction. The curling portion is provided such that an end portion of the bracket is folded in a curved shape. Because the guiding portion constitutes a part of the curling portion, the wire harness is guided while contacting a surface of the curling portion when the wire harness is slid along the guiding portion.

According to the battery mounting structure in the constitution described above, when the terminal that is connected to the wire harness is being connected to the electrode of the battery, it is possible to prevent the wire harness from rubbing against a ridge portion of the bracket and to guide the wire harness further smoothly.

In the battery mounting structure in the constitution described above, the bracket may include an extended portion that is provided at each of end portions of the bracket in the vehicle width direction and that extends toward a front of the vehicle.

According to the battery mounting structure in the constitution described above, because the extended portion that extends toward front of the vehicle is formed on both of the end portions of the bracket in the vehicle width direction, when a component that is placed forward of a bracket in the vehicle hits the bracket during a frontal collision of the vehicle, a displacement of the bracket in a right and left direction is restricted between the right and left extended portions.

According to the battery mounting structure in the constitution described above, it is possible to prevent or effectively restrict direct interference of the component that is placed forward of the bracket in the vehicle with the battery during the frontal collision of the vehicle.

In the battery mounting structure in the constitution described above, the bracket may be placed rearward of a joining flange in the vehicle that is formed on each of rear end portions of an inner panel and an outer panel of a rear wheel house and is joined to each other.

According to the battery mounting structure in the constitution described above, because the bracket is placed rearward of the joining flange in the vehicle that is formed on each of the rear end portions of the inner panel and the outer panel of the rear wheel house and is joined to each other, the joining flange hits the bracket when the battery moves toward the front of the vehicle by inertia during the frontal collision of the vehicle, for example.

According to the battery mounting structure in the constitution described above, it is possible to prevent or effectively restrict the direct interference of the joining flange of the rear wheel house with the battery during the frontal collision of the vehicle.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 5A is a side view for explaining an action during a frontal collision of the vehicle and shows a state before the collision;

FIG. 5B is a side view for explaining an action during the frontal collision of the vehicle and shows a state after the collision;

DETAILED DESCRIPTION OF EMBODIMENTS

A battery mounting structure according to an embodiment of the present invention will be described with reference to FIG. 1 to FIG. 6. Appropriately shown in these FIGs., an arrow RE represents a rear direction of a vehicle, an arrow UP represents an upper direction, and an arrow OUT represents an outer side of a vehicle width direction.

Figure 1:
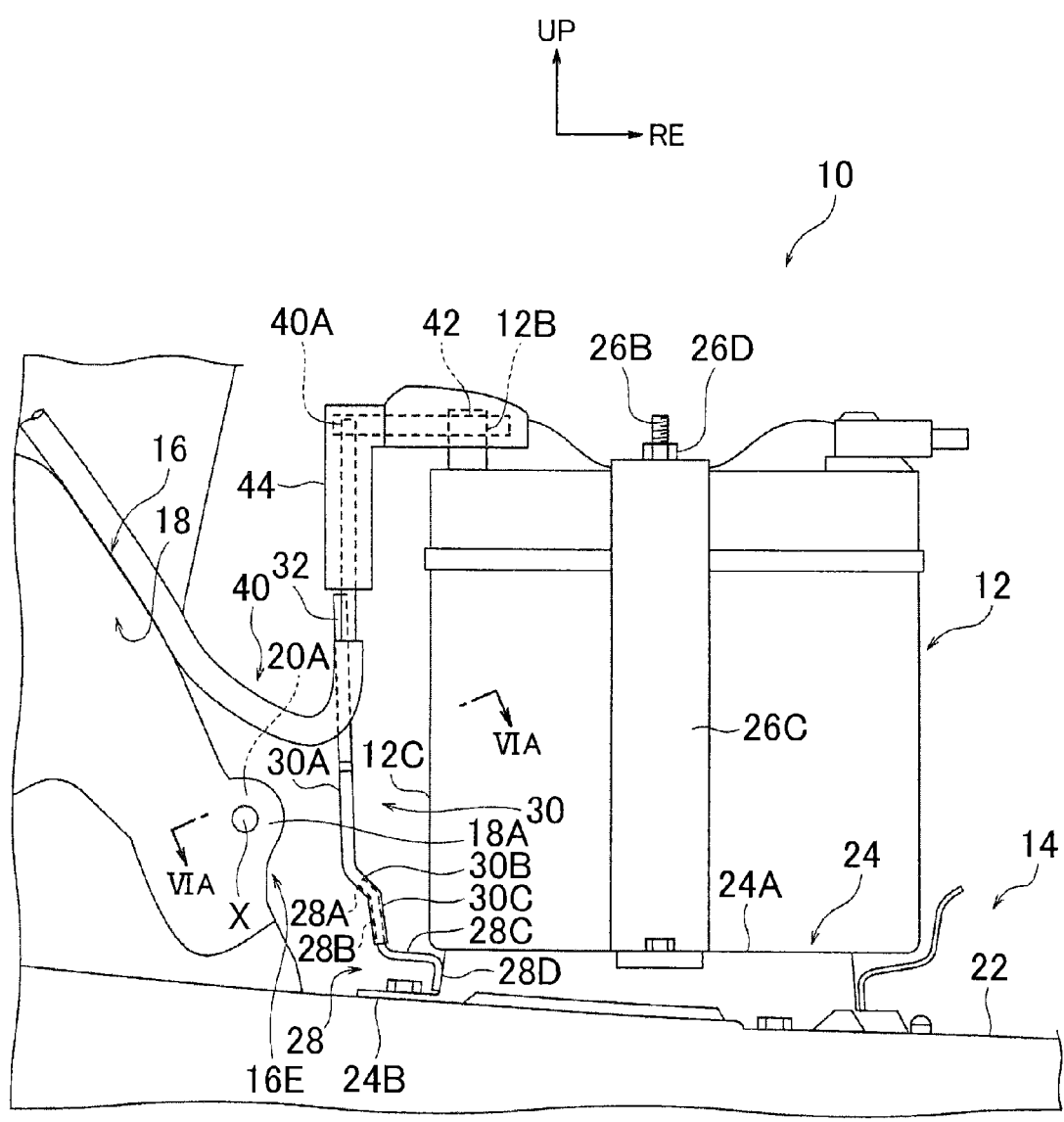
FIG. 1 is a side view that shows a battery mounting structure according to an embodiment of the present invention when seen from an inner side in a vehicle width direction.
Figure 2:
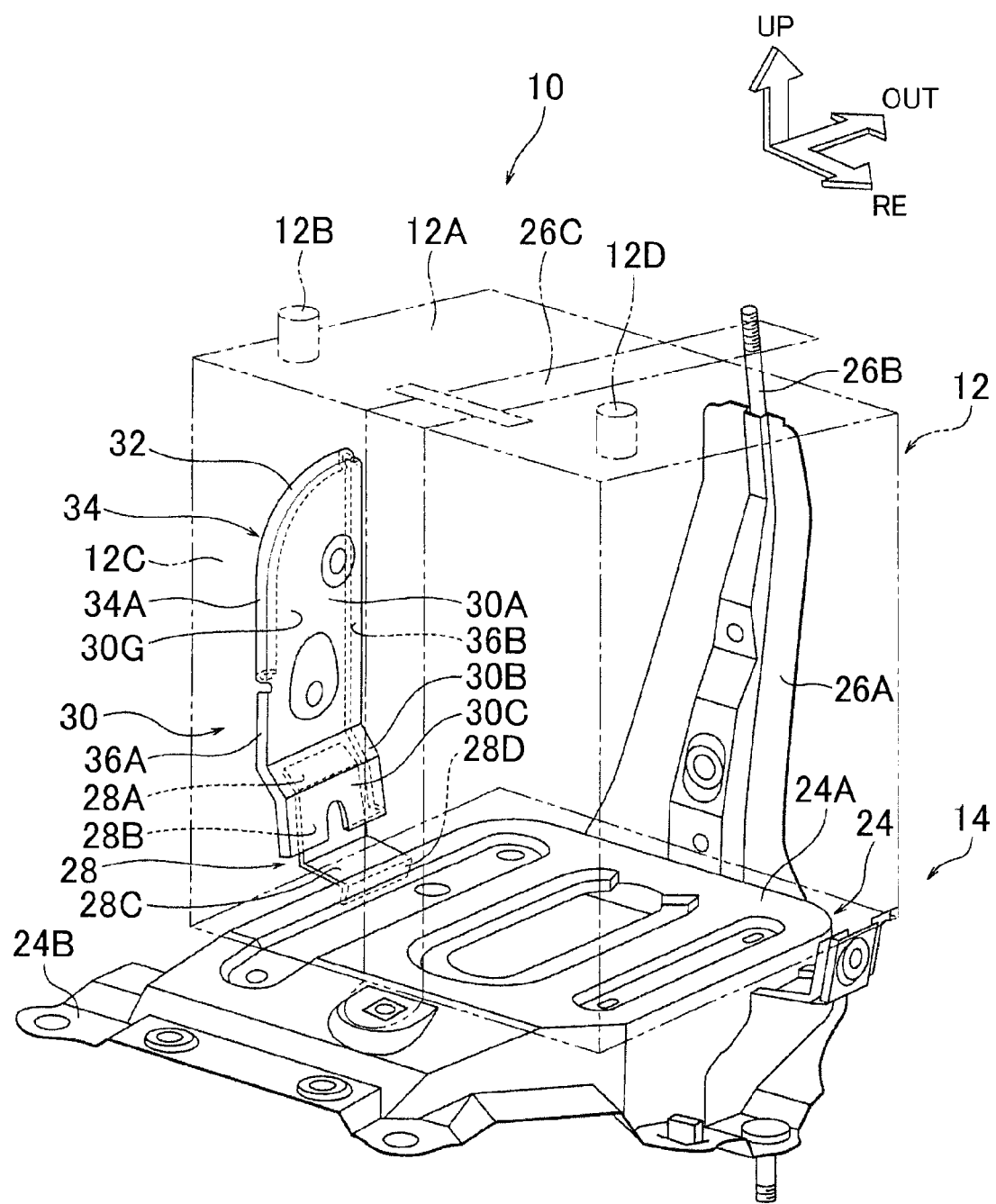
FIG. 2 is a perspective view that shows a portion of the battery mounting structure according to the embodiment of the present invention when seen from the inner side and diagonally behind in the vehicle width direction, and a battery is shown see-through in a two-dot chain line.
Figure 3:
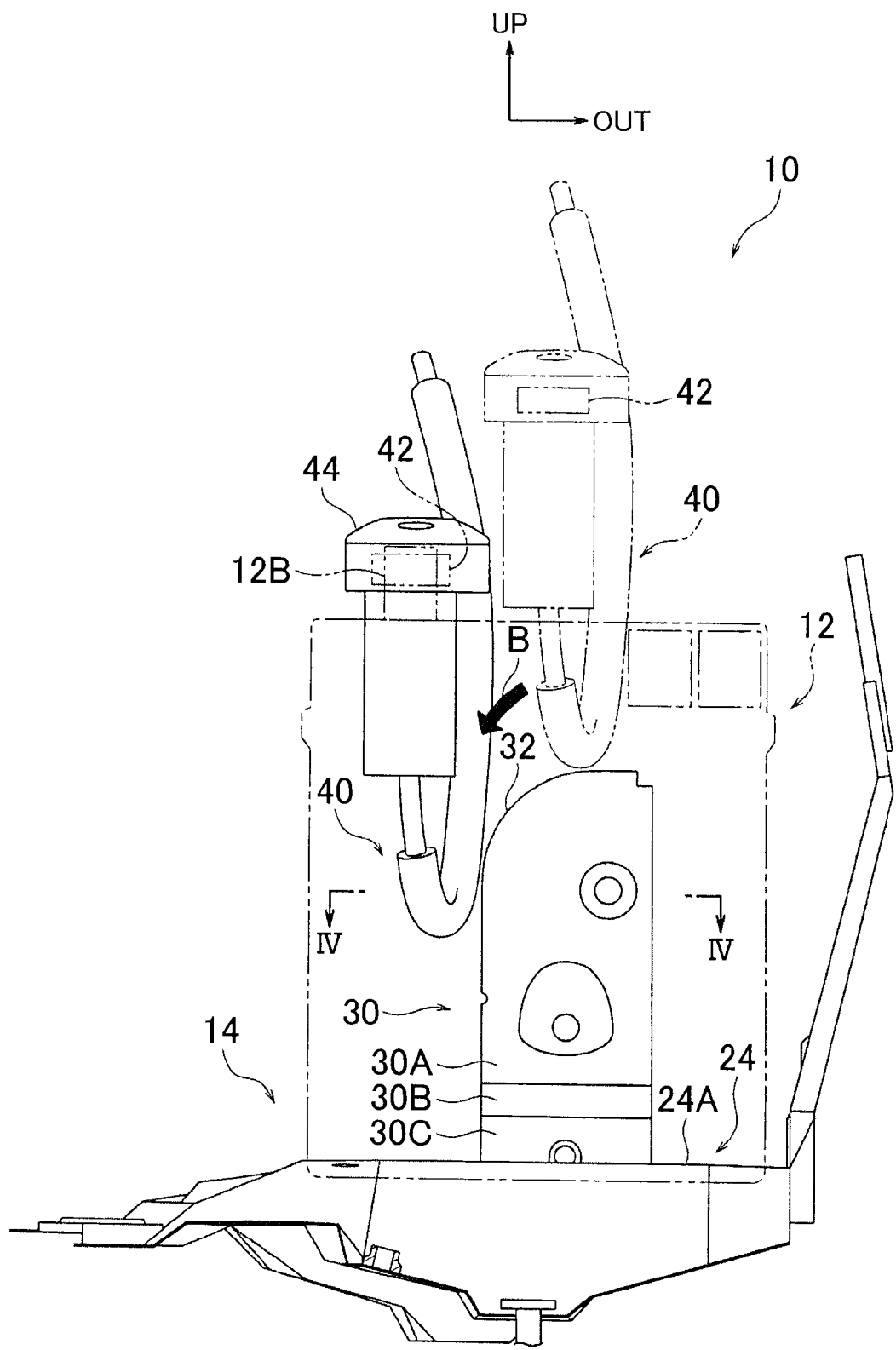
FIG. 3 is a rear view that shows the battery mounting structure according to the embodiment of the present invention when seen from a rear side of a vehicle, and the battery is shown see-through in the two-dot chain line.

In FIG. 1, a battery mounting structure 10 according to the embodiment of the present invention is shown in a side view that is seen from an inner side in the vehicle width direction. In FIG. 2, a portion of the battery mounting structure 10 is shown in a perspective view that is seen from the inner side and diagonally behind in the vehicle width direction. In FIG. 3, the battery mounting structure 10 is shown in a rear view. In FIG. 2 and FIG. 3, a battery 12 is shown see-through in a two-dot chain line.

The battery 12 shown in these FIGs. is mounted in a hybrid vehicle as an auxiliary device. As shown in FIG. 2, the battery 12 as a whole has roughly a rectangular parallelepiped shape. A battery post 12B as an electrode is vertically arranged in a portion on a front end and on the inner side in the vehicle width direction of an upper face 12A of the battery 12. A battery post 12D is also vertically arranged in a portion on a rear end and on the inner side in the vehicle width direction of the upper face 12A of the battery 12. A terminal 42 (see FIG. 1) that is connected to the battery post 12B in the front side will be described later. A description of a terminal and the like that are connected to the battery post 12D in the rear side will be omitted.

Figure 6A:
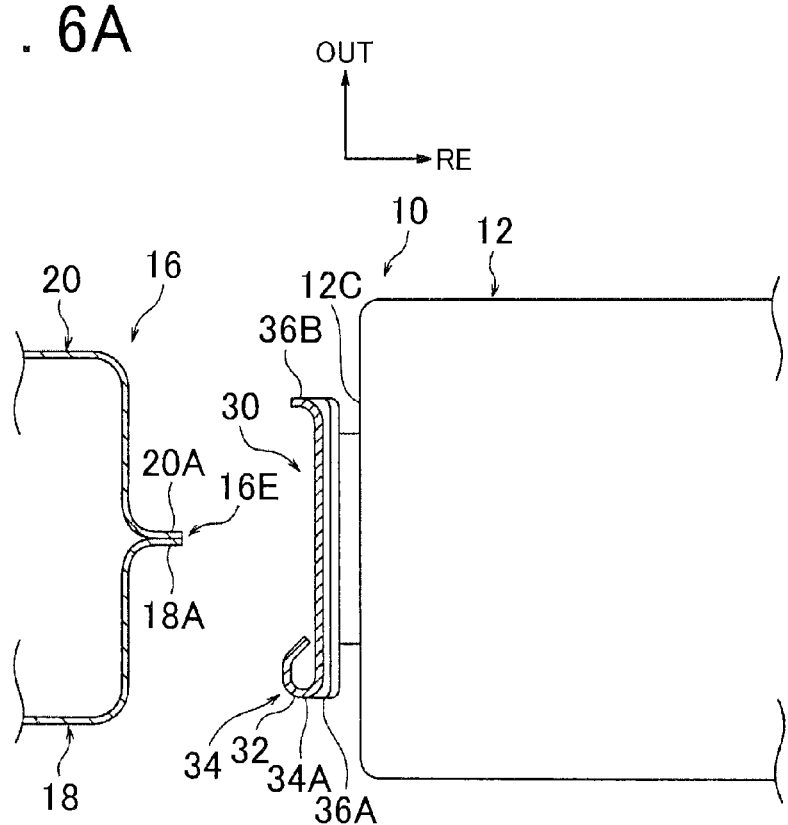
FIG. 6A is a cross-sectional view of a schematic plan for explaining an action during the frontal collision of the vehicle, corresponds to a cross section along the line VIA-VIA in FIG. 1, and shows a state before the collision.

As shown in FIG. 1, a mounting portion 14 of the battery 12 is provided in a rear side of the vehicle and, in this embodiment, is placed rearward of a rear wheel house 16 in the vehicle. As shown in FIG. 6A (a figure that corresponds to a cross section along the line VIA-VIA in FIG. 1) that shows a component for covering an upper part of an unshown rear tire, the rear wheel house 16 includes a wheel house inner panel 18 on the inner side in the vehicle width direction and a wheel house outer panel 20 on the outer side in the vehicle width direction. A joining flange 18A that is formed on a rear end of the wheel house inner panel 18 and a joining flange 20A that is formed on a rear end of the wheel house outer panel 20 are joined to each other by spot welding. In FIG. 1, a spot point of the joining flange 18A is indicated by a reference symbol X.

As shown in FIG. 1 and FIG. 2, the mounting portion 14 of the battery 12 is provided with a battery carrier 24. The battery carrier 24 includes a battery tray 24A on which the battery 12 is mounted. Also in the battery carrier 24, a fixing flange 24B is extended on a periphery of the battery tray 24A. As shown in FIG. 1, the flange 24B of the battery carrier 24 is placed on a floor panel 22 and is bolted to the floor panel 22. A portion of the flange 24B is bolted to a rear side member (not shown) via the floor panel 22.

As shown in FIG. 2, a bottom end of a battery bolting plate 26A is joined to a portion of the battery tray 24A on the outer side in the vehicle width direction. The battery bolting plate 26A extends upward, and a bolt 26B is fixed to an upper portion of the battery bolting plate 26A. This bolt 26B penetrates an end of a battery clamp 26C, and a nut 26D (see FIG. 1) is screwed onto a tip of the bolt 26B. The battery clamp 26C includes an upper band that is placed to face an upper face of the battery 12 and that extends in the vehicle width direction, a side band that is bent downward of the vehicle from an end of the upper band on the inner side in the vehicle width direction, and a flange that is bend inward in the vehicle width direction from a bottom end of the side band and that is fixed to the battery carrier 24. As described above, the battery 12 that is mounted on the battery tray 24A is held by the battery bolting plate 26A, the bolt 26B, the nut 26D (see FIG. 1), the battery clamp 26C, and the like. Accordingly, a displacement of the battery 12 is restricted in the upper and width directions of the vehicle.

Also, the mounting portion 14 of the battery 12 is provided with a bracket 30 that is made of a sheet metal and is placed to face a front face 12C of the battery 12. The bracket 30 is placed on the outer side in the vehicle width direction with respect to the battery post 12B when seen from the front of the vehicle or from the rear of the vehicle (see FIG. 3). A bottom end of the bracket 30 is attached to the battery tray 24A via a connecting bracket 28. The bracket 30 that is placed as described above has a function to protect the battery 12 against a rear end 16E of the joining flanges 18A, 20A of the rear wheel house 16 that is shown in FIG. 6 during a frontal collision of the vehicle. A description on the bracket 30 will be made later.

As shown in FIG. 2, the connecting bracket 28 includes a first joined portion 28B that is joined to a front face of a bottom end wall 30C of the bracket 30. Also, the connecting bracket 28 includes a second joined portion 28D that is joined to a front face of the battery tray 24A. The first joined portion 28B extends upward of the vehicle while slightly inclined toward the front side of the vehicle. The second joined portion 28D extends downward of the vehicle while slightly inclined toward the front side of the vehicle. A bottom end of the first joined portion 28B and an upper end of the second joined portion 28D are connected by a connecting portion 28C. The connecting portion 28C is placed approximately parallel to the floor panel 22 (see FIG. 1). Further, an end portion 28A on the upper end of the connecting bracket 28 is bent upward and diagonally toward the front side of the vehicle from an upper end of the first joined portion 28B.

Meanwhile, as shown in FIG. 1, a terminal 42 is connected to the battery post 12B that is vertically arranged on the upper face of the battery 12. A tip 40A of a wire harness 40 is connected (attached) to the terminal 42. A connecting portion of the terminal 42 with the battery post 12B is formed in a ring shape (not shown). Thus, the terminal 42 is connected to the battery post 12B by inserting the battery post 12B in the ring shape. A battery positive cover 44 that is made of resin is attached to the terminal 42 and the tip 40A of the wire harness 40. The wire harness 40 is placed forward of the battery 12 in the vehicle and is also displaced on the inner side of the bracket 30 in the vehicle width direction (on one side in the vehicle width direction) (see FIG. 3).

The bracket 30 includes a main body 30A as a vertical wall that is placed above the connecting bracket 28. The main body 30A constitutes an upper portion and an intermediate portion in a vertical direction of the bracket 30, and extends upward of the vehicle while slightly inclined toward the front side of the vehicle. A position of the main body 30A in a front and rear direction of the vehicle is arranged such that the main body 30A interferes with a trajectory of movement of the wire harness 40 when the terminal 42 is connected to the battery post 12B. Also in the bracket 30, the main body 30A and a bottom end wall 30C are connected by a connecting portion 30B. The connecting portion 30B is formed such that it is bent rearward and diagonally downward of the vehicle from a bottom end of the main body 30A while bent forward and diagonally upward of the vehicle from an upper end of the bottom end wall 30C.

In a description below, as a matter of convenience, a general flat portion of each of the main body 30A, the connecting portion 30B, and the bottom end wall 30C will be referred to as a bracket general portion 30G as a whole. These general flat portions are portions that exclude curved portions provided on both ends of the main body 30A, the connecting portion 30B, and the bottom end wall 30C in the vehicle width direction.

As shown in FIG. 2 and FIG. 3, a guiding portion 32 in a curved shape is provided from an upper end portion to a side portion on the inner side in the vehicle width direction (on the one side in the vehicle width direction) of the bracket 30. More specifically, the guiding portion 32 is in an arc shape. Also, the upper end portion of the bracket 30 is located below the upper face of the battery 12. As shown in FIG. 3, the guiding portion 32 is arranged to slide and guide the wire harness 40 to a position in a routed state in a vehicle width direction when the wire harness 40 contacts the guiding portion 32 from above. The routed state of the wire harness 40 is a final arrangement state. In FIG. 3, the wire harness 40 immediately before being slid along the guiding portion 32 is shown in a two-dot chain line while the wire harness 40 in the position in the routed state is shown in a solid line. Here, the state immediately before the wire harness 40 is slid along the guiding portion 32 is a state that the wire harness 40 is in a position where a work is to be started.

Figure 4:
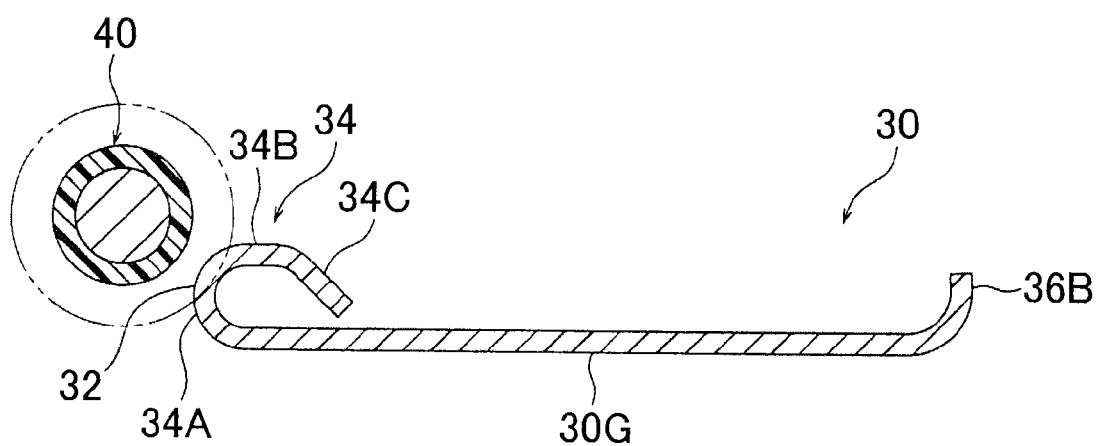
FIG. 4 is an enlarged cross-sectional view along the line Iv-Iv in FIG. 3.

Further, as shown in FIG. 4 that is an enlarged cross-sectional view along the line IV-IV in FIG. 3, and also as shown in FIG. 2, a curling portion 34 that is folded in a curved shape (or in a hairpin shape) is formed from the upper end portion to the side portion on the inner side in the vehicle width direction (on the one side in the vehicle width direction) of the bracket 30. As shown in FIG. 4, on the side end portion on the inner side in the vehicle width direction of the bracket 30, the curling portion 34 includes a side plate 34A as an extended portion that is curved in an arc shape from the inner end in the vehicle width direction of the bracket general portion 30G while extending toward the front of the vehicle.

Also, the curling portion 34 includes a front plate 34B that extends from a front end of the side plate 34A toward the outer side in the vehicle width direction and that is placed to face a front side of the bracket general portion 30G. Further, the curling portion 34 includes a tip 34C that is bent such that the tip 34C gradually approaches the bracket general portion 30G from an outer end of the front plate 34B in the vehicle width direction. A slight room is formed between an end of the tip 34C of the curling portion 34 and the bracket general portion 30G. The guiding portion 32 described above constitutes a part of the curling portion 34. In FIG. 4, an area that is surrounded by a two-dot chain line 40X on a periphery of the wire harness 40 indicates a movable area of the wire harness 40 in the routed state.

Also, as shown in FIG. 2, on the inner side end portion of the bracket 30 in the vehicle width direction, a side plate 36A is formed as an extended portion that extends from the bracket general portion 30G toward the front of the vehicle. The side plate 36A is formed below the curling portion 34. The side plate 36A is a portion that is bent toward the front of the vehicle on the side end portion on the inner side in the vehicle width direction of the bracket 30. A position of the side plate 36A in the vehicle width direction is aligned with a position of the side plate 34A in the vehicle width direction. Meanwhile, a side plate 36B is formed on an outer side end portion of the bracket 30 in the vehicle width direction (see FIG. 4). The side plate 36B is formed as an extended portion that extends from the bracket general portion 30G toward the front of the vehicle. The side plate 36B is a portion that is bent toward the front of the vehicle on the side end portion on the outer side in the vehicle width direction of the bracket 30 (from the outer end in the vehicle width direction of the bracket general portion 30G). The curling portion 34 (that includes the side plate 34A) and the side plates 36A, 36B described above constitute a catch structure that prevents removal of the rear end portion 16E of the joining flanges 18A, 20A of the rear wheel house 16 shown in FIG. 6 from the bracket 30 when the rear end portion 16E hits the bracket 30 during the frontal collision of the vehicle. The catch structure is displacement restriction means that restricts a displacement of the rear end portion 16E of the joining flanges 18A, 20A in the vehicle width direction.

Moreover, as shown in FIG. 6A, the bracket 30 is placed on the outer side in the vehicle width direction with respect to the curling portion 34 while being placed on the inner side in the vehicle width direction with respect to the side plate 36B. In other words, the bracket 30 is arranged such that the intermediate portion of the bracket 30 in the vehicle width direction is placed rearward of the joining flanges 18A, 20A of the rear wheel house 16 in the vehicle.

Next, a description will be made on an action and an effect when the frontal collision occurs to a vehicle that adopts the battery mounting structure 10 according to the embodiment.

As shown in FIG. 5A and FIG. 6A, the bracket 30 is placed rearward of the joining flanges 18A, 20A of the rear wheel house 16 in the vehicle. Accordingly, when the battery 12 on the battery tray 24A (see FIG. 5A) moves toward the front of the vehicle by inertia during the frontal collision of the vehicle, as shown in FIG. 5B, the rear end portion 16E of the joining flanges 18A, 20A hits the bracket 30. At this time, the bracket 30 is inclined toward the front side of the vehicle (see an arrow A direction in FIG. 5A) because the bottom end portion of the bracket 30 is pushed by inertial force of the battery 12. As described above, the bracket 30 prevents interference of the battery 12 with the rear end portion 16E of the joining flanges 18A, 20A.

Figure 6B:
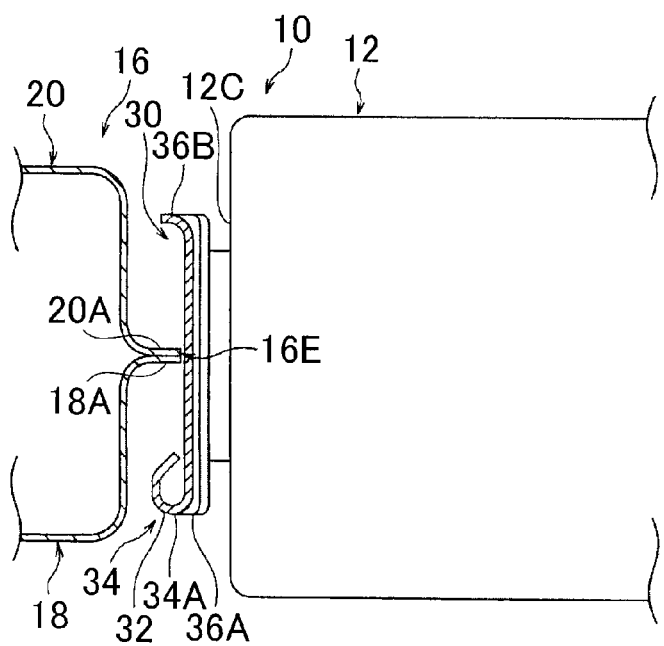
FIG. 6B is a cross-sectional view of a schematic plan for explaining an action during the frontal collision of the vehicle, corresponds to the line VIA-VIA in FIG. 1, and shows a state after the collision.

Also, as shown in FIG. 6A, the side plates 34A, 36A, 36B that extend toward the front of the vehicle are formed on both of end portions of the bracket 30 in the vehicle width direction. Accordingly, as shown in FIG. 6B, when the joining flanges 18A, 20A of the rear wheel house 16 hit the bracket 30 during the frontal collision of the vehicle, displacements of the joining flanges 18A, 20A in the right and left direction are restricted between the right and left side plates 34A, 36A, 36B. Therefore, it is possible to prevent or effectively restrict direct interference of the rear end portion 16E of the joining flanges 18A, 20A with the battery 12 during the frontal collision of the vehicle.

Next, a description will be made on a process to connect the terminal 42 to the battery post 12B that are shown in FIG. 3. A description will also be made on an action and an effect when the terminal 42 is connected to the battery post 12B.

When the terminal 42 that is connected to the wire harness 40 is to be connected to the battery post 12B, the terminal 42 is first placed above the front end of the battery 12, and a portion of the wire harness 40 is placed above the bracket 30. Next, when the wire harness 40 contacts the guiding portion 32 of the bracket 30 from above, the wire harness 40 is slid along the guiding portion 32 (see an arrow B direction). Accordingly, because the wire harness 40 is guided toward a position in the routed state in the vehicle width direction, the wire harness 40 is effectively routed. Also, it is possible to prevent the wire harness 40 from being placed on the outer side of the bracket 30 in the vehicle width direction (in an irregular position in the embodiment).

Here, as shown in FIG. 2, the curling portion 34 that is folded in a curved shape is provided on the end portion of the bracket 30 and extends from the upper end portion to the side portion on the inner side in the vehicle width direction. The guiding portion 32 constitutes a part of the curling portion 34. Accordingly, when the wire harness 40 that is shown in FIG. 3 is slid along the guiding portion 32, the wire harness 40 is guided while contacting a surface of the curling portion 34 (see FIG. 2). Therefore, it is possible to prevent the wire harness 40 from being rubbed against a ridge of the bracket 30 when the wire harness 40 is guided by the guiding portion 32 (the curling portion 34 (see FIG. 2)). In addition, the wire harness 40 can be guided further smoothly. It should be noted that, although not limited to a time for connecting the battery, even when the wire harness 40 interferes with the bracket 30 during travelling of the vehicle and the like, the wire harness 40 does not contact the ridge of the bracket 30 but contacts the curling portion 34 due to the arrangement of the curling portion 34. As a result, the connected wire harness 40 can also be prevented from damage.

As it has been described so far, with the battery mounting structure 10 according to the embodiment, it is possible to improve a procedure for connecting the terminal 42 that is connected to the wire harness 40 to the battery post 12B.

The guiding portion 32 (the bracket 30) that is shown in FIG. 1 may be a portion that can guide the wire harness 40 to the position in the routed state in the vehicle width direction only when the battery 12 is placed in a preliminary assumed regular position (a position where there is no assembly error in a front and rear direction of the vehicle). In addition, the guiding portion 32 (the bracket 30) can be a portion that can guide the wire harness 40 to the position in the routed state in the vehicle width direction only when the battery 12 is placed rearward of the preliminary assumed regular position in the vehicle (when there is an assembly error).

In other words, only when the battery 12 is placed in the preliminary assumed regular position, the guiding portion 32 (the bracket 30) may be arranged in a position in the front and rear direction of the vehicle where the guiding portion 32 (the bracket 30) interferes with the trajectory of movement of the wire harness 40 at a time of connecting the battery. The arrangement in this position will be called a first arrangement hereafter. In addition, only when the battery 12 is placed rearward of the preliminary assumed regular position in the vehicle, the guiding portion 32 (the bracket 30) may be arranged in the position in the front and rear direction of the vehicle where the guiding portion 32 (the bracket 30) interferes with the trajectory of movement of the wire harness 40 at the time of connecting the battery. The arrangement in this position will be called a second arrangement hereafter.

To make an additional description on the second arrangement, in the second arrangement, the wire harness 40 is placed forward of and apart from the bracket 30 in the vehicle when the battery 12 is in the regular position. That is, a positional relation between the wire harness 40 and the bracket 30 differs from that is shown in FIG. 1. In the second arrangement, when the battery 12 is in the regular position, it is arranged such that the trajectory of movement of the wire harness 40 at the time of connecting the battery does not interfere with the bracket 30. Meanwhile, in the second arrangement, when the battery 12 is mounted in a specified position that is rearward of the regular position on the battery carrier 24 in the vehicle, the trajectory of movement of the wire harness 40 at the time of connecting the battery interferes with the bracket 30. Accordingly, the guiding portion 32 can guide the wire harness 40 to the position in the routed state in the vehicle width direction.

In the above embodiment, as shown in FIG. 2, the guiding portion 32 is formed in the arc shape when seen from the rear of the vehicle. The guiding portion may be formed in an ellipsoidal arc shape (a curved shape in a broad sense) toward the position of the wire harness in the routed state in the vehicle width direction. Also, the guiding portion may be in another shape that is inclined toward the position of the wire harness in the routed state in the vehicle width direction.

In the above embodiment, the curling portion 34 that is folded to be in the curved shape is formed on the end portion of the bracket 30 from the upper end portion to the side portion on the inner side in the vehicle width direction (on the one side in the vehicle width direction), and such a constitution is preferred. However, it is possible to adapt a constitution in which the bracket does not include the curling portion.

In the above embodiment, the side plates 34A, 36A, 36B are formed that are bent toward the front of the vehicle on the both of the end portions of the bracket 30 in the vehicle width direction. However, the extended portions may be formed by a method other than bending. In addition, it is possible to adapt a constitution in which the bracket does not include the side plates on the both of the end portions in the vehicle width direction.

In the above embodiment, as shown in FIG. 6A, the bracket 30 is placed rearward of the joining flanges 18A, 20A of the rear wheel house 16 in the vehicle. However, the bracket that is placed to face the front face of the battery may be placed rearward of other vehicle components such as a suspension tower in the vehicle.

In the above embodiment, the description has been made on a case where the one side in the vehicle width direction is the inner side in the vehicle width direction. However, the one side in the vehicle width direction may be the outer side in the vehicle width direction.

It should be noted that the above embodiment and plural modifications described above can be realized by being combined appropriately.

What is claimed is:

1. A battery mounting structure, comprising:

a battery that is mounted in a vehicle and includes an electrode on an upper portion of the battery;

a bracket that is provided on a mounting portion of the battery and is placed to face a front face of the battery;

a wire harness that is connected to a terminal connected to the electrode of the battery, the wire harness being placed forward of the battery in the vehicle and displaced to one side of the bracket in a vehicle width direction; and a guiding portion that extends from an upper end portion of the bracket to a side portion of the bracket on one side in the vehicle width direction and guides the wire harness to a position in a routed state by sliding the wire harness to the one side in the vehicle width direction, and the wire harness contacts the guiding portion from above, wherein the guiding portion is curved from the upper end portion of the bracket to the side portion on the one side in the vehicle width direction, wherein the upper end portion is closer to a top surface of the battery than the side portion on the one side is to the top surface of the battery, and wherein the wire harness is located beside a side end surface of the bracket on which the guiding portion is formed, in the vehicle width direction.

2. The battery mounting structure according to claim 1, wherein the bracket includes a curling portion extending from the upper end portion of the bracket to the side portion of the bracket on the one side in the vehicle width direction, the curling portion is provided such that an end portion of the bracket is folded in a curved shape in a horizontal sectional view, and the guiding portion constitutes a part of the curling portion.

3. The battery mounting structure according to claim 2, wherein the bracket includes an extended portion that is provided at each of end portions of the bracket in the vehicle width direction and that extends toward a front of the vehicle.

4. The battery mounting structure according to claim 3, wherein the bracket is placed rearward of a joining flange portion that is formed on each of rear end portions of an inner panel and an outer panel of a rear wheel house and is joined to each other.

5. The battery mounting structure according to claim 2, wherein the one side in the vehicle width direction is an inner side in the vehicle width direction.

6. The battery mounting structure according to claim 5, wherein the electrode is placed on the upper portion of the battery at a position on an inner side of the battery in the vehicle width direction.

7. The battery mounting structure according to claim 2, wherein the bracket is placed rearward of a joining flange that is formed on each of rear end portions of an inner panel and an outer panel of a rear wheel house and is joined to each other.

8. The battery mounting structure according to claim 1, wherein the bracket includes an extended portion that is provided at each of end portions of the bracket in the vehicle width direction and that extends toward a front of the vehicle.

9. The battery mounting structure according to claim 8, wherein the bracket is placed rearward of a joining flange portion that is formed on each of rear end portions of an inner panel and an outer panel of a rear wheel house and is joined to each other.

10. The battery mounting structure according to claim 1, wherein the upper end portion of the bracket is located below an upper face of the battery.

11. The battery mounting structure according to claim 1, wherein the guiding portion is curved so that the upper end portion is higher than the side portion on the one side in the vehicle width direction.

12. The battery mounting structure according to claim 1, wherein the bracket is placed rearward of a joining flange portion that is formed on each of rear end portions of an inner panel and an outer panel of a rear wheel house and is joined to each other.

* * * * *